US006956330B2

(12) United States Patent
Santori et al.

(10) Patent No.: US 6,956,330 B2
(45) Date of Patent: Oct. 18, 2005

(54) QUANTUM-DOT TRIGGERED PHOTON AND TRIGGERED PHOTON PAIR

(75) Inventors: Charles Santori, Sunnyvale, CA (US); Matthew Pelton, Chicago, IL (US); Yoshihisa Yamamoto, Stanford, CA (US)

(73) Assignees: The Board of Trustees of the Leland Stanford Junior University, Stanford, CA (US); Stanford Junior University Japan Science and Technology Corporation (JP)

( * ) Notice: Subject to any disclaimer, the term of this patent is extended or adjusted under 35 U.S.C. 154(b) by 245 days.

(21) Appl. No.: 10/450,336

(22) PCT Filed: Sep. 13, 2001

(86) PCT No.: PCT/US01/42153

§ 371 (c)(1),
(2), (4) Date: Jul. 21, 2003

(87) PCT Pub. No.: WO02/056238

PCT Pub. Date: Jul. 18, 2002

(65) Prior Publication Data

US 2005/0025200 A1 Feb. 3, 2005

Related U.S. Application Data

(60) Provisional application No. 60/256,006, filed on Dec. 15, 2000.

(51) Int. Cl.[7] ............................... H01J 7/24; H01S 3/10
(52) U.S. Cl. ........................ 315/111.81; 372/20; 372/23
(58) Field of Search .................... 315/111.81; 372/20, 372/23, 43, 45; 257/9, 13–14

(56) References Cited

U.S. PATENT DOCUMENTS

| 5,187,715 | A | * | 2/1993 | Weisbuch et al. | 372/46 |
| 5,877,509 | A | * | 3/1999 | Pau et al. | 257/14 |
| 5,978,397 | A | * | 11/1999 | Capasso et al. | 372/45 |
| 6,148,012 | A | * | 11/2000 | Capasso et al. | 372/45 |
| 6,541,788 | B2 | * | 4/2003 | Petroff et al. | 257/21 |

* cited by examiner

Primary Examiner—Thuy Vinh Tran
(74) Attorney, Agent, or Firm—Lumen Intellectual Property Services, Inc.

(57) ABSTRACT

A device including a photon emitter, a light source, and a filter with a corresponding method for producing triggered single photons and triggered pairs of polarization-entangled photons are provided. The light source delivers a pulse to a photon emitter and generates pairs of electrons and holes to emit photons. The light source includes a mechanism to tune a pulse wavelength to an excited state-absorption resonance of the photon emitter. The light source could also include a device to selectively choose a polarization to create the pairs of electrons and holes of a particular spin. A filter isolates the last and single photon. Optionally, a micro-cavity is included to direct the emitted photons and couple to one or more optical elements. When the device or the method is used to produce triggered pairs of polarization-entangled photons, it works almost the same as for the single photons, except for modifications to the way the light source excites the photon emitter and how emission filtering is performed.

82 Claims, 7 Drawing Sheets

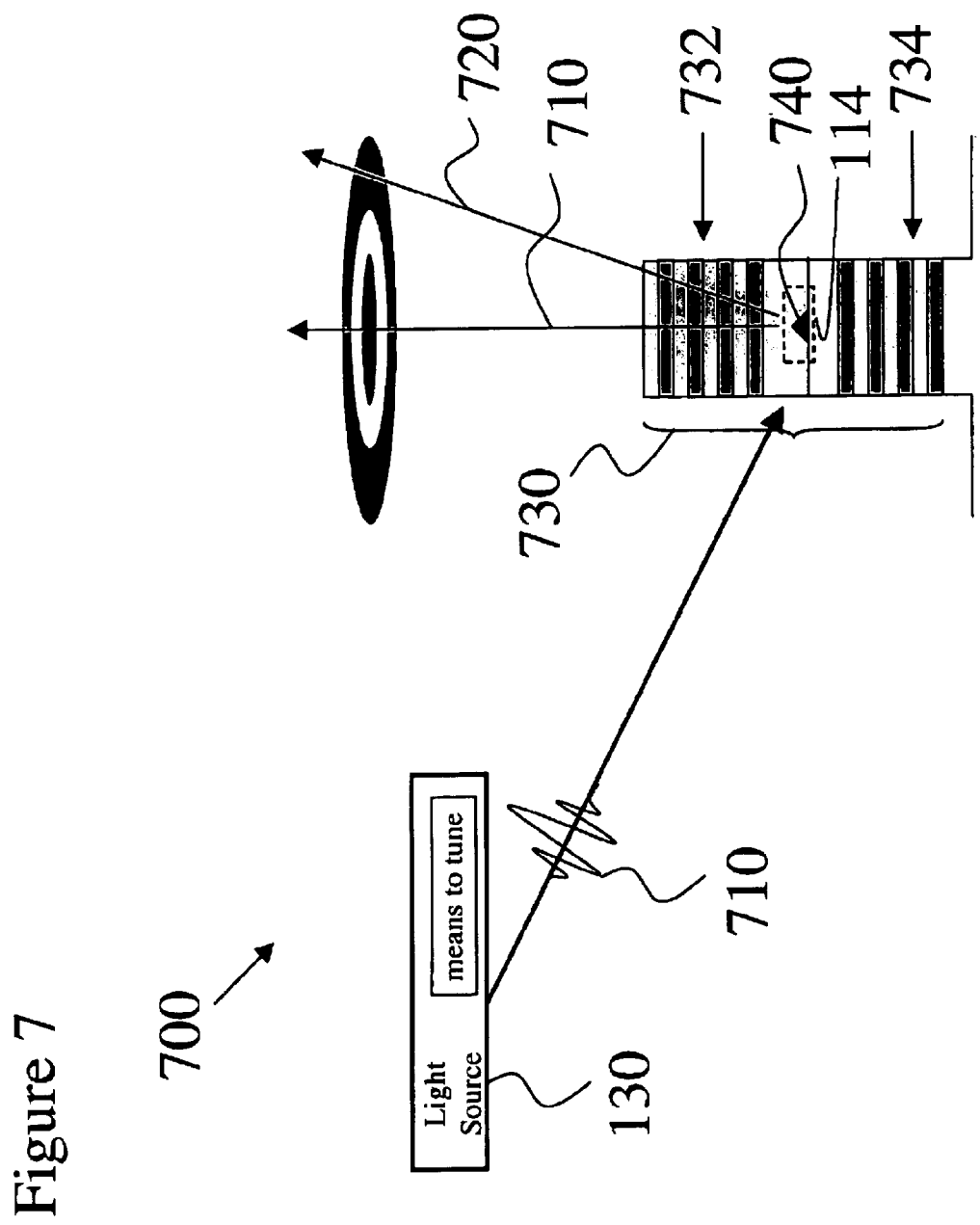

QUANTUM-DOT TRIGGERED PHOTON AND TRIGGERED PHOTON PAIR

CROSS-REFERENCE TO RELATED APPLICATIONS

This application is cross-referenced to and claims priority from U.S. Provisional application 60/256,006 filed Dec. 15, 2000, which is hereby incorporated by reference.

FIELD OF THE INVENTION

This invention relates generally to quantum communication and computation. More particularly, the present invention relates to a device and method for producing triggered single photons and triggered pairs of polarization-entangled photons using a quantum dot.

BACKGROUND

Streams of single photons, or single pairs of polarization-entangled photons, arriving within known time intervals have potential applications in the new fields of quantum communications and quantum computing. Most significantly, the recently demonstrated scheme of quantum cryptography involves encoding information on the polarization of a single photon. Security from eavesdropping is provided by the fact that one cannot measure the polarization of a single photon without altering it. Large expenditures will soon be directed towards research on quantum cryptography and efficient single photon sources.

Several protocols for quantum cryptography have been proposed, of which "BB84" in reference "*C. H. Bennett and G. Brassard. Proceedings of IEEE International Conference on Computers, Systems, and Signal Processing, Bangalore, India IEEE, New York, 1984, pp. 175–179, 1984*" and "Ekert" in reference "*A. K. Ekert. Quantum cryptography based on Bell's theorem. Physical Review Letters, 67(6), 661–663, 1991*" are two popular examples. In the BB84 protocol, a stream of single photons is needed. The presently available source, a highly attenuated laser, leaves the arrival photon number random, and thus requires a much lower data transmission rate to avoid two-photon events, than would be possible with a regulated photon source. One of the most successful methods so far to generate single photons is single-molecule fluorescence. A molecule is excited by a laser pulse, and emits a single photon in response. This approach suffers from two difficulties, rapid photo-bleaching (destruction of optical activity) of the molecules, and limited collection efficiency of the emitted photons. Another approach is fluorescence from single color center in diamond crystals. However, in this approach the emitted photons have a very large variation in wavelength. In the Ekert protocol, a stream of polarization-entangled photon pairs is needed. The most practical existing entangled photon source, parametric down-conversion, produces a number of photon pairs according to a Poisson distribution, rather than deterministically producing exactly one photon pair. A source of single pairs of polarization-entangled photons would be beneficial to this scheme. A few other applications for such photon sources are possible, including a random number generator, a light intensity standard, fundamental tests of quantum mechanics, quantum teleportation and quantum computation.

Accordingly, there is a need to develop a device and method that is capable of providing both triggered single photons of definite polarization, and triggered pairs of polarization-entangled photons. In addition, there is a need to develop a device and method that does not suffer from photo bleaching, and allows a high collection efficiency.

SUMMARY OF THE INVENTION

The present invention provides a device and method for producing triggered single photons and triggered pairs of polarization-entangled photons.

The device and method for producing triggered single photons includes a photon emitter, a light source and a filter. The light source delivers a pulse to the photon emitter and generates pairs of electrons and holes inside the photon emitter to emit photons. The photon emitter could for instance be a semiconductor quantum dot. The light source includes means to tune a pulse wavelength to an excited state-absorption resonance of the photon emitter. The light source could also include means to selectively choose a polarization to create pairs of electrons and holes of a particular spin. The light source is intense enough that at least one of the pairs of electrons and holes is generated with a high probability for a pulse. The light source is usually a pulsed laser. The filter isolates the last and single photon from the emitted photons and is, for instance, an interference filter or a diffraction grating monochrometer. The filter includes means to distinguish between excitonic and biexcitonic emissions lines. The filter also rejects scattered light from the light source.

The device and method for producing triggered single photons optionally includes a micro-cavity to direct the emitted photons into a single spatial mode and coupling single mode single photons to one or more optical elements such as an optical fiber. The micro-cavity includes a small volume and a means for long photon storage time. The micro-cavity is, for instance, a micro-post distributed-Bragg-reflector cavity or a micro-sphere cavity.

When the device or method of the present invention is used to produce triggered pairs of polarization-entangled photons it works almost the same as the single photon device and method as described above, except for modifications to the way the light source excites the photon emitter and how emission filtering is performed. The device and method for producing triggered pairs of polarization-entangled photons includes a photon emitter; and a light source to deliver a pulse to the photon emitter to generate two electron-hole pairs with opposite spin inside the photon emitter to emit two photons. The first of the two photons is at a biexcitonic wavelength and second of the two photons is at an excitonic wavelength. The device and method for producing triggered pairs of polarization-entangled photons optionally includes a micro-cavity to increase the collection efficiency of the emitted photons and to direct the emitted photons into a single spatial mode and coupling the single mode single photons to one or more optical elements such as an optical fiber.

Alternatively, the device and method producing triggered pairs of polarization-entangled photons according to the present invention could include a photon emitter and a light source to deliver two pulses in succession to the photon emitter. The first of the two pulses is tuned to a narrow absorption resonance to generate a first electron-hole pair in an excited state, and with a polarization of the light source chosen to yield a definite spin, and second of the two pulses at a slightly lower energy is tuned to a narrow absorption resonance to generate a second electron-hole pair in an excited state, and with a polarization chosen to yield a spin opposite to that of the first electron-hole pair.

Another alternative device and method producing triggered pairs of polarization-entangled photons according to the present invention includes a photon emitter and a light source to deliver a pulse to the photon emitter generating several electron-hole pairs of both spins. In addition, this device and method includes a filter to isolate only a single-exciton emission line and narrowly accept only the emissions line corresponding to two electron-hole pairs with opposite spins.

In view of that which is stated above, it is the objective of the present invention to provide a device and method for producing triggered single photons.

It is another objective of the present invention to provide a device and method producing triggered pairs of polarization-entangled photons.

It is yet another objective of the present invention to tune a pulse wavelength of the light source to an excited state-absorption resonance of the photon emitter.

It is still another objective of the present invention to include means to selectively choose a polarization to create pairs of electrons and holes of a particular spin.

It is still another objective of the present invention to provide a light source that is intense enough that at least one of the pairs of electrons and holes is generated with a high probability for a pulse.

It is another objective of the present invention to include a micro-cavity to increase the collection efficiency of the emitted photons and to direct the emitted photons into a single spatial mode and to couple the single mode single photons to one or more optical elements.

Advantages of the present invention over the prior art are that the system enables one to generate single photons with narrow spectral line-widths, without photo-bleaching, and that the device may be incorporated into larger solid structures. Further advantages of the present invention over the prior art are that the system enables one to generate single pairs of polarization-entangled photons, whereas the most practical existing source, spontaneous parametric down-conversion, can only generate a Poisson-distributed number of polarization-entangled photon pairs.

BRIEF DESCRIPTION OF THE FIGURES

The objectives and advantages of the present invention will be understood by reading the following detailed description in conjunction with the drawings, in which:

FIG. 7 a polarization-entangled photon pair source using two separate cavity modes to spectrally select 1X and 2X lines.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention provides a device and method for producing triggered single photons and triggered pairs of polarization-entangled photons. According to a preferred embodiment of the present invention, the device and method for producing triggered single photons and triggered pairs of polarization-entangled photons include the following components: (i) a photon emitter, (ii) a light source, and (iii) a spectral filter. Optionally, the present invention includes a micro-cavity.

Figure 1:
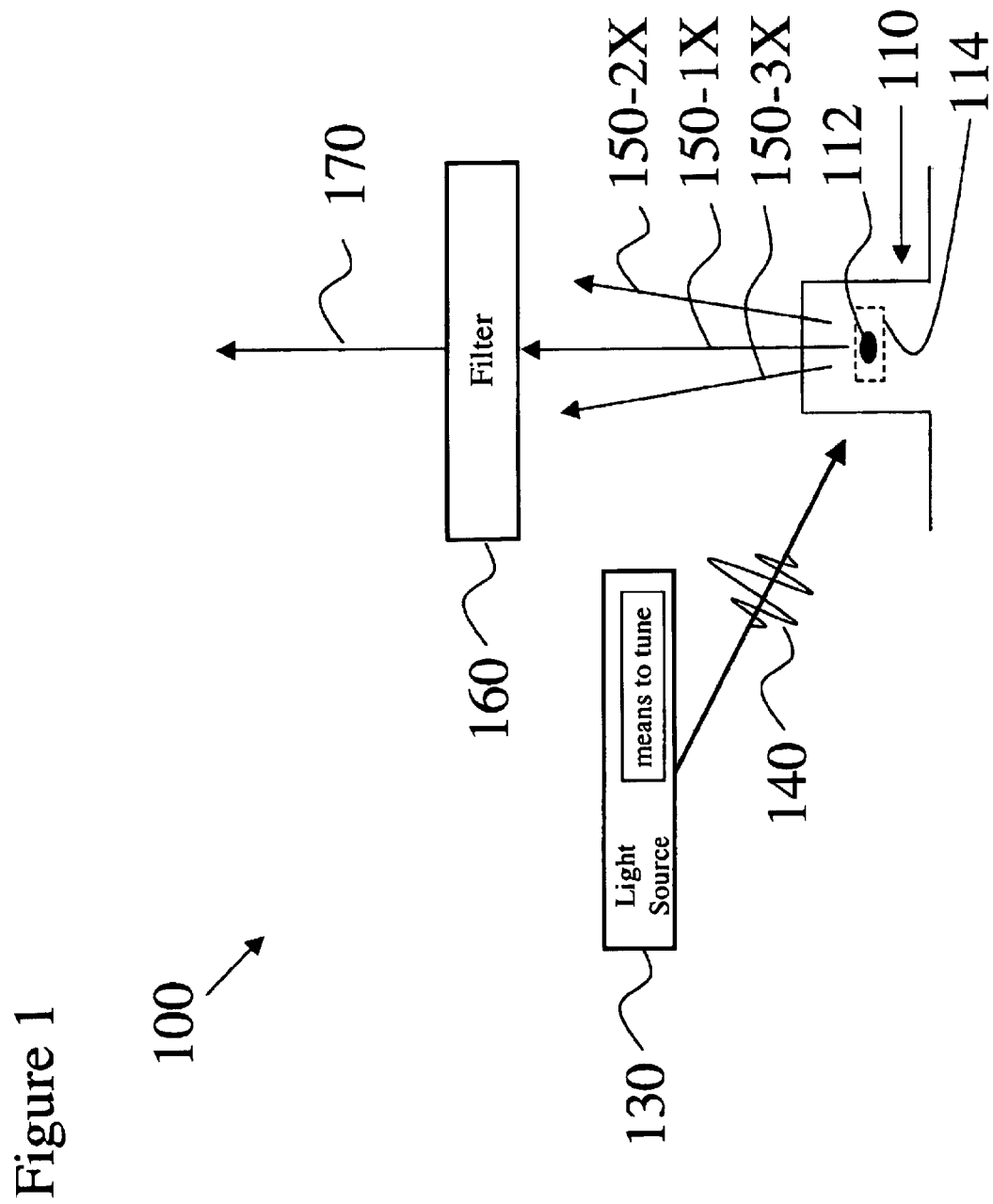
FIG. 1 shows a single photon source according to the present invention.

FIG. 1 shows a single photon device 100 for producing triggered single photons. Device 100 includes a photon emitter 110, which is preferably an isolated semiconductor quantum dot. Electrons and holes confined inside photon emitter 110 have discrete energy levels as in atoms. The quantum dot is, for instance, but not limited to, a tiny island of smaller-bandgap semiconductor material 112 surrounded by a larger-bandgap matrix 114. Typical examples of photon emitter 110 include an InGaAs region surrounded by GaAs, an InP region surrounded by GaInP, or a GaAs region surrounded by AlGaAs. The quantum dot could, for example, also be an InAs self-assembled dot.

Light source 130 delivers pulse 140 and excites photon emitter 110. Light source 130 can be a light source with a spectrum in the near infrared range. Pulse 140 generates pairs of electrons and holes inside photon emitter 110 to emit photons 150-1X, 150-2X, and 150-3X. Light source 130 is preferably a tunable, pulsed laser. Light source 130 includes means to tune the pulse wavelength of pulse 140 to an excited state-absorption resonance of photon emitter 110. Another way of tuning photon emitter 110 in an excited state-absorption resonance is, for instance, by changing the temperature of the photon emitter 110.

Light source 130 should be intense enough that at least one of the pairs of electrons and holes is generated with a high probability for pulse 140. The generated electrons and holes then rapidly relax down to the lowest unoccupied energy levels, and begin to recombine, emitting photons 150-1X, 150-2X, and 150-3X. The emitted photon 150-1X, 150-2X, and 150-3X wavelengths reflect not only the unperturbed energy levels of the recombining electrons and holes, but also the number of other electron-hole pairs present inside of the dot at that time, due to electrostatic interactions. Thus, the last electron-hole pair to recombine emits at a unique wavelength.

Spectral filter 160 isolates the last and single photon 170 from emitted photons 150-1X, 150-2X, and 150-3X. Filter 160 has a resolution that is able to distinguish between excitonic (one electron and one hole) and biexcitonic (two electrons and two holes) emissions lines, such as that it can be tuned to the one-exciton line. For typical dots, these lines are about 1–2 nanometers apart in wavelength, requiring preferably a high-resolution spectral filter or an interference filter. Emitted photons like 2X (150-2X), 3X (150-3X)etc. may be present depending on the excitation properties of pulse 140. Filter 160 also rejects scattered light from light source 130.

Figure 2:
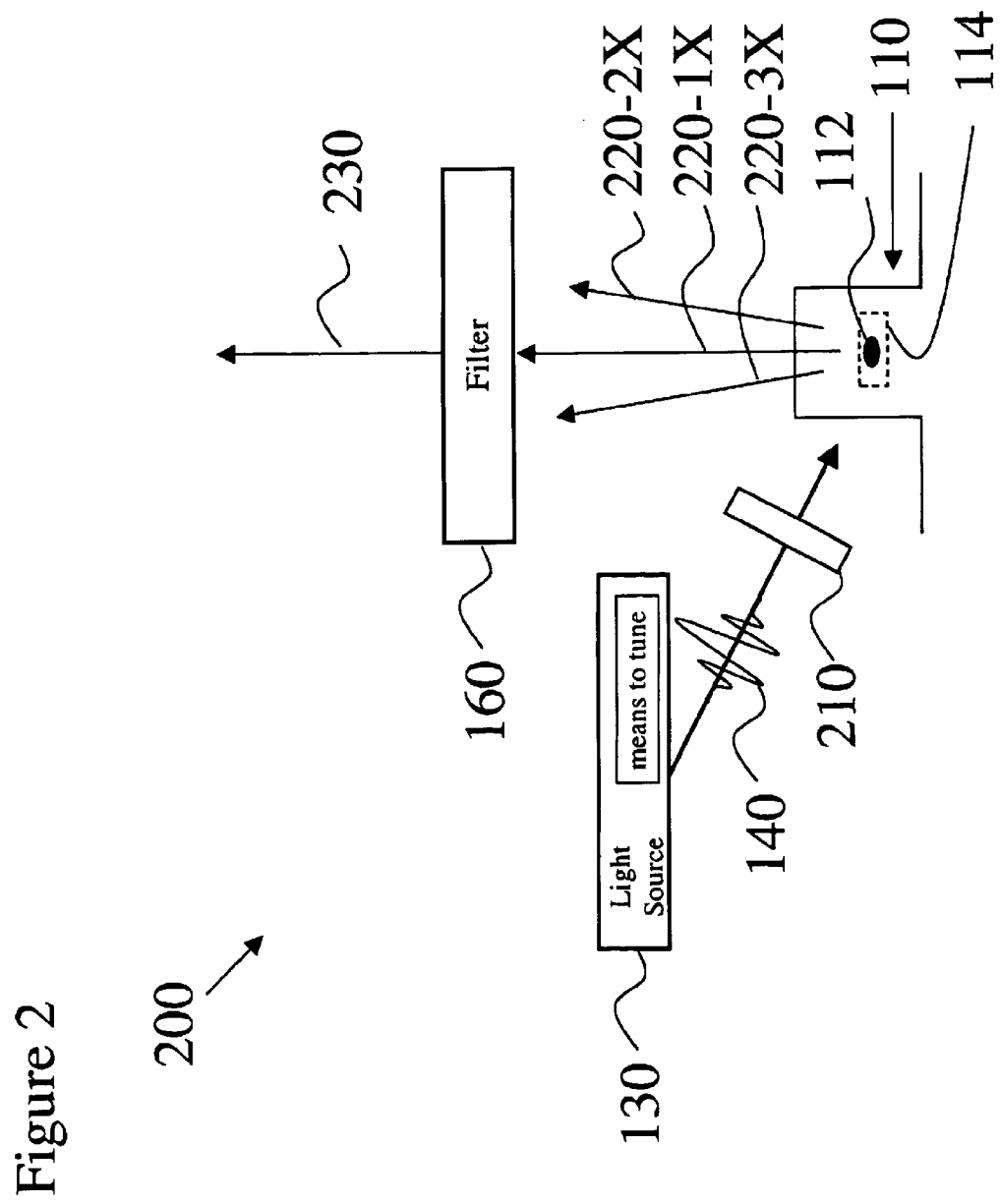
FIG. 2 shows a single photon source with a polarizer according to the present invention.

In addition, the device 100 in FIG. 1 includes a polarizer 210, creating device 200 in FIG. 2, wherein one can choose the polarization of light source 130 to selectively create an electron-hole pairs of a particular spin. If this spin is preserved until the electron and hole recombine, then the emitted photon 220-1X will have a well-controlled polarization, an advantage for quantum cryptography. The last emitted photon, in case polarizer 210 is used, is now a polarized last emitted photon 230. In this particular example, emitted photons like 2X (220-2X), 3X (220-3X)etc. may be present depending on the excitation properties of pulse 140.

Figure 3:
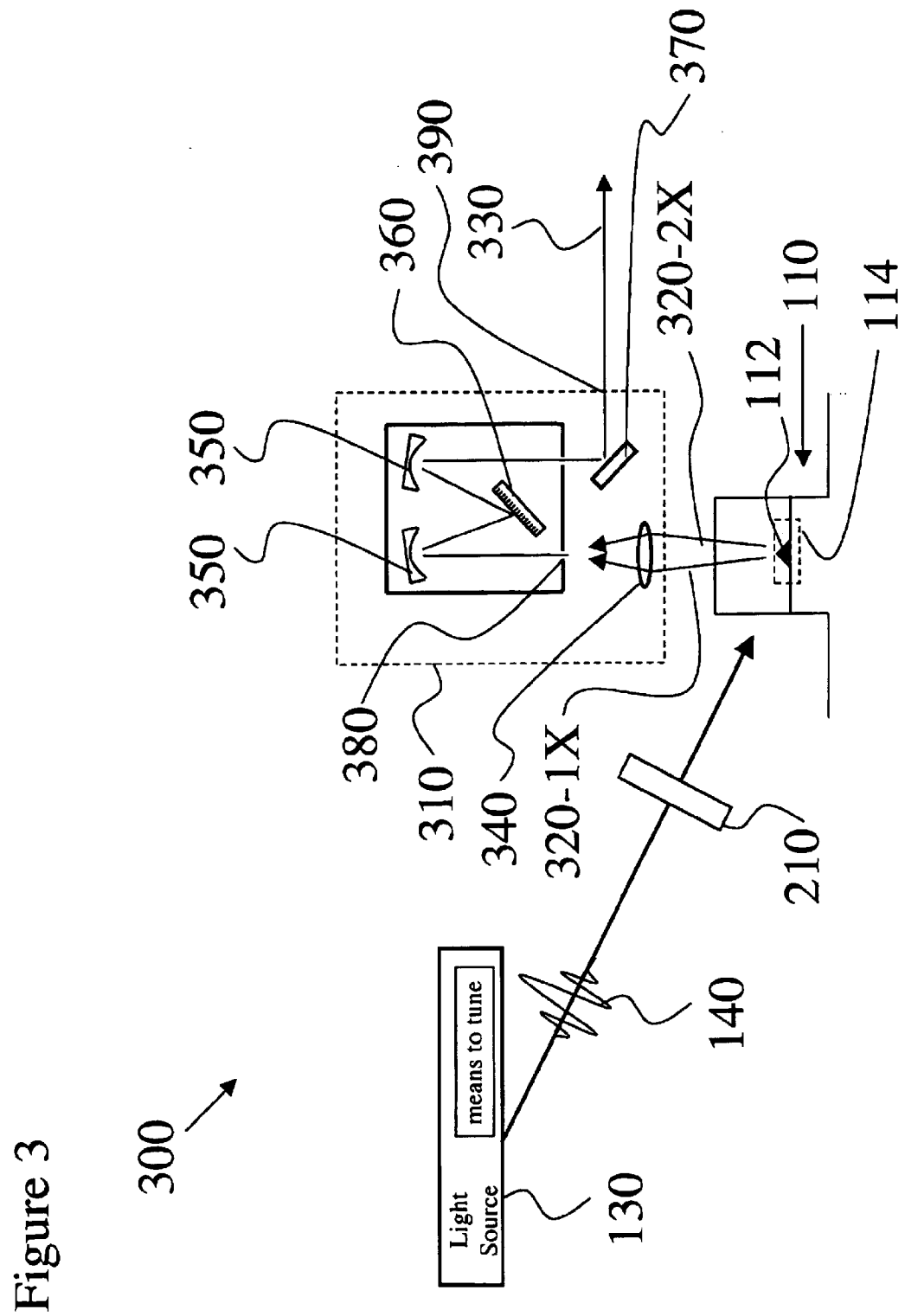
FIG. 3 shows a single photon source with a polarizer and a grating monochrometer according to the present invention.

FIG. 3 shows an example of a grating monochometer 310 in single photon device 300 that is used as filter to filter emitted photons 320-1X and 320-2X and tune to a 1X line to emit the last photon 330. In this particular example, grating monochometer 310 includes an input slit 380 projected on an output slit 390 by means of a lens 340, concave mirrors 350, a diffraction grating 360 and a plane mirror 370.

Figure 4:
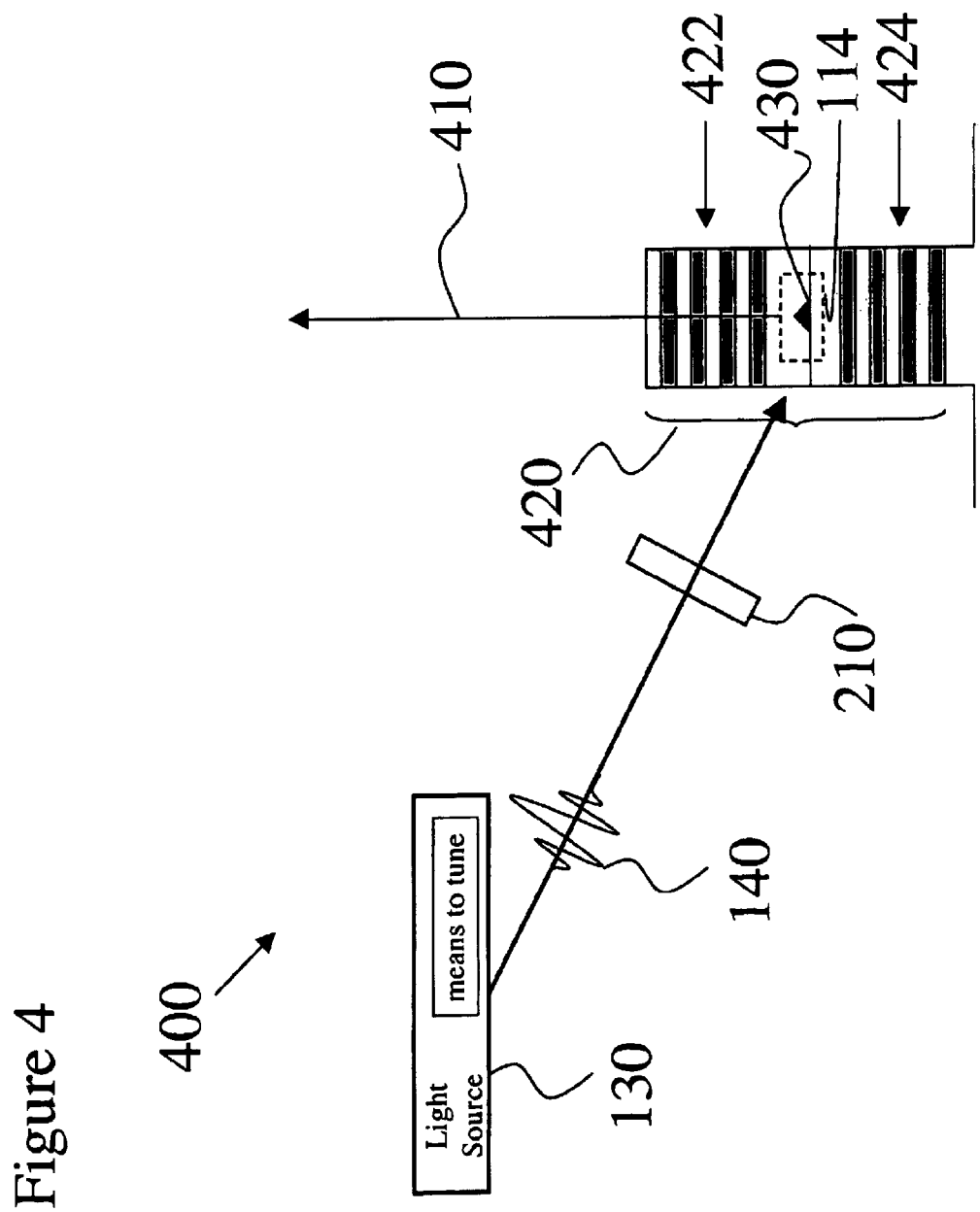
FIG. 4 shows a single photon source with a polarizer and micro-post cavity according to the present invention.

FIG. 4 shows single photon device 400 to emit photon 410 with an example of a micro-cavity, which is optional, and used to increase the efficiency, with which the photons are collected, by directing as many of the emitted photons as possible into a single spatial mode for subsequent coupling into optical fibers or other optical element. Without such a micro-cavity, the photons are emitted in random directions, and most are lost. A convenient cavity useful for this function is a micropost, distributed-Bragg-reflector (DBR) cavity as shown in FIG. 4 by 420. Alternating crystal layers 422 and 424 with two different indices of refraction are grown on either side of the quantum dot 430 to form a high-quality cavity, and then a tiny (<1 micron) post is etched around dot 430, through the entire DBR structure.

Figure 5:
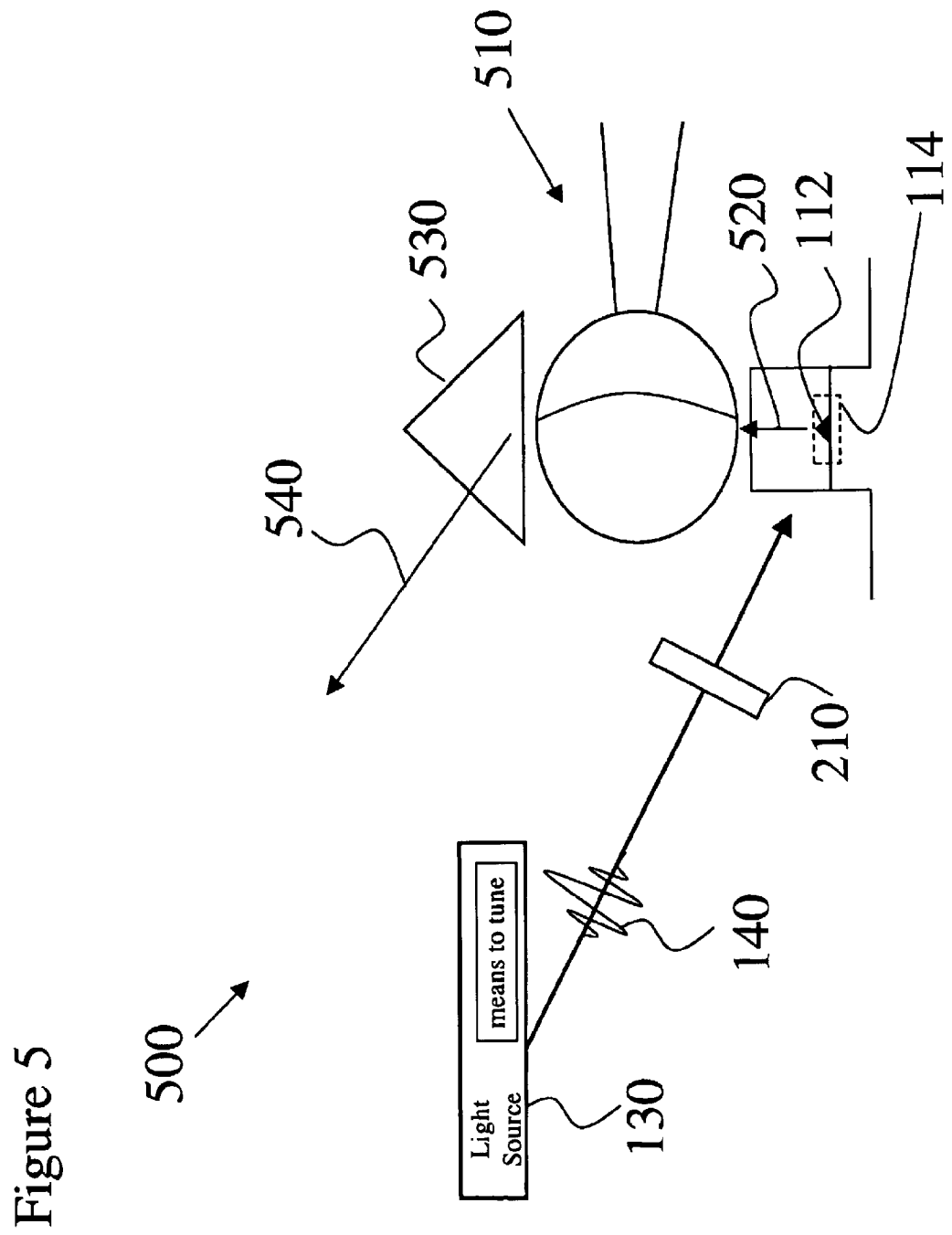
FIG. 5 shows a single photon source with a polarizer and a micro-sphere resonator according to the present invention.

Another example of a micro-cavity is a single photon device 500 with a micro-sphere resonator 510 to receive photon 520 as shown in FIG. 5 that is coupled to an output coupler 530, or prism, to direct single photon 540. In micro-sphere resonator 510 a tiny glass sphere is held close to the dot. High quality "whispering-gallery" modes exist along the surface of the sphere, and light couples into and out of these modes through evanescent fields. However, any cavity with small volume and long photon storage time can potentially serve this purpose.

Figure 6:
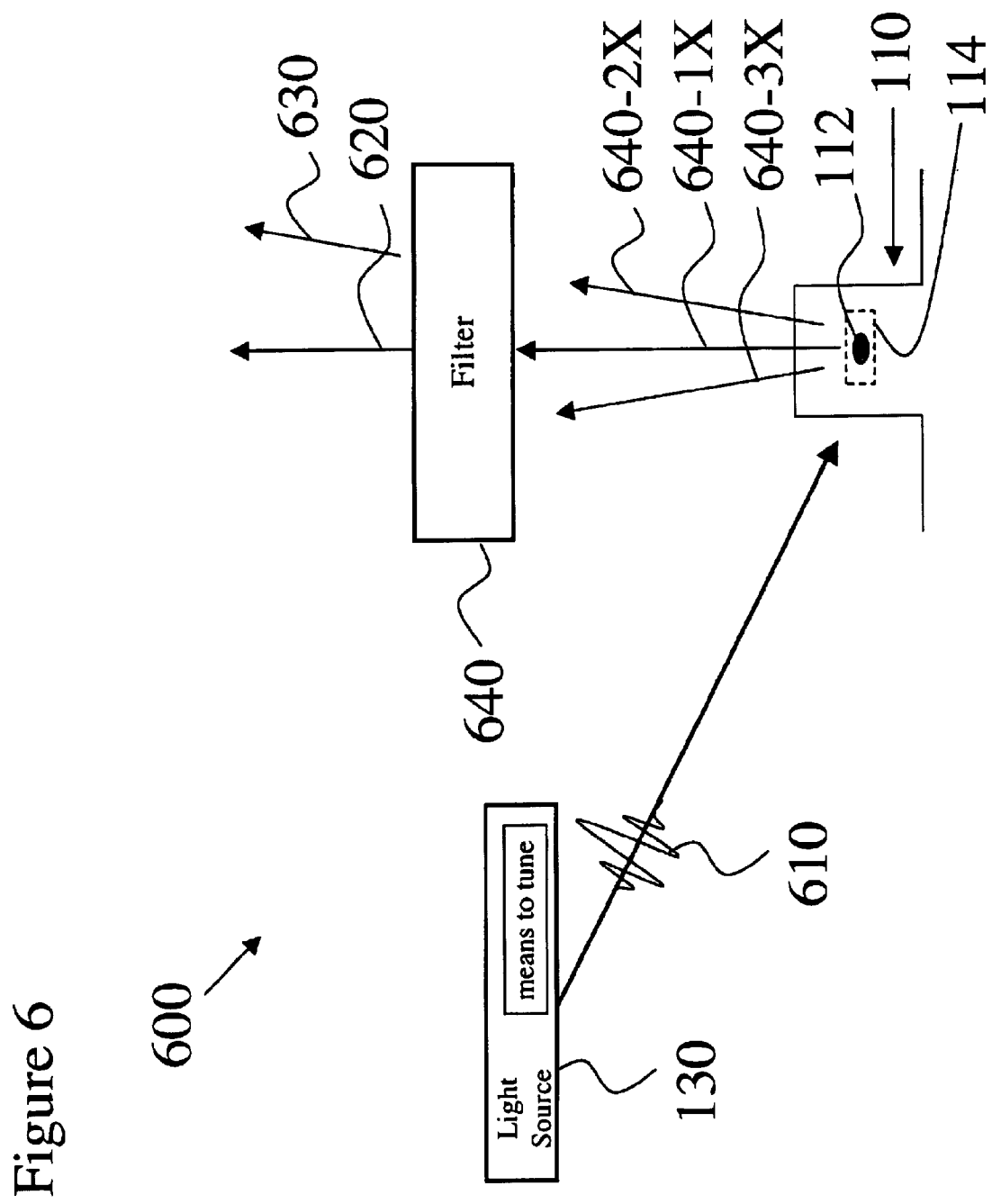
FIG. 6 a polarization-entangled photon pair source.

When the device or method of the present invention is used to produce triggered pairs of polarization-entangled photons it works almost the same as the single photon device and method as described above, except for modifications to the way the light source excites the photon emitter and how emission filtering is performed. When the device of the present invention is used to produce triggered pairs of polarization-entangled photons as shown in FIG. 6 by 600, laser pulse 610 creates exactly two electron-hole pairs with opposite spins. The electron-hole pairs relax down to the ground state, and when they recombine, they emit two photons 620 and 630, one of which emits at the biexcitonic wavelength and the other emits at the excitonic wavelength. If the selection rules are strong, and if spin relaxation is slow compared to the radiative lifetime, then a pair of polarization-entangled photons is produced for each laser pulse 610. FIG. 6 is an exemplary embodiment of a polarization-entangled photon pair device 600 emitting the last two photons 620 and 630. In this case, spectral filter 640 is selected to pass 1X and 2X lines from emitted photons 640-1X, 640-2X and 640-3X.

FIG. 7 shows another exemplary embodiment of a polarization-entangled photon pair device 700 emitting the last two photons 710 and 720 using two separate cavity modes to spectrally select 1X and 2X lines using a micropost micro-cavity 730 similar to 410 in FIG. 4. Micropost microcavity 730 contains alternating crystal layers 732 and 734 with two different indices of refraction that are grown on either side of the quantum dot 740 to form a high-quality cavity, and then a tiny (<1 micron) post is etched around dot 740, through the entire DBR structure. The present invention includes the case where a micro-cavity is used to improve the collection efficiency of the emitted photons. A special case of this is where one transverse spatial mode of the micro-cavity is resonant with the 1X line, and another transverse spatial mode is resonant with the 2X line. In this case, the 1X and 2X photons are emitted in different directions, and can be separated from each other without the need for a beam-splitter.

Exciting two electron-hole pairs with opposite spins could be accomplished by, for instance, two methods. One possible method uses two laser pulses in rapid succession. The first laser pulse is tuned to a narrow absorption resonance to generate one electron-hole pair in an excited state, and with the polarization chosen to yield a definite spin. After the electron-hole pair relaxes down to the ground state, a second pulse at slightly different energy (to take into account the biexcitonic effect) is tuned to a narrow absorption resonance to generate another electron-hole pair in an excited state, and with polarization chosen to yield a spin opposite to that of the first pair. The emission filter rejects scattered light from the excitation laser.

In an alternative method, several electron-hole pairs of both spins are created with a single laser pulse. When only two pairs are left, there is roughly a fifty-percent chance that they will have opposite spins. If they have same spins, then one of the electron-hole pairs must be in the excited state, due to the Pauli exclusion principle. Thus, the spatial wavefunction will be different from that of the ground state, and the biexcitonic energy shift will be slightly different. With high enough filtering resolution, these two cases can be distinguished for the second-to-last emitted photon. Thus, if filters are used to accept only single-exciton emission and narrowly accept only the line corresponding to two electron-hole pairs with opposite spins, two photons with fifty-percent probability are received, which have entangled polarizations. This method requires emission lines being narrow so that many different states of the dot can be spectrally resolved, including the same-spin and opposite-spin biexcitonic states, and also states with more than two electron-hole pairs, which must be rejected while passing the biexcitonic line. If a micro-cavity is used to improve collection efficiency, both the excitonic and biexcitonic emission lines must be in resonance.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A device for producing triggered single photons, comprising:
   a) a photon emitter;
   b) a light source to deliver a pulse to said photon emitter generating pairs of electrons and holes inside said photon emitter to emit photons, wherein said light source comprises means to tune a pulse wavelength to an excited state-absorption resonance of said photon emitter; and
   c) a filter to isolate the last and single photon from said emitted photons, said filter comprises means to distinguish between excitonic and biexcitonic emissions lines.

2. The device of claim 1, wherein said light source further comprises means to selectively choose a polarization to create said pairs of electrons and holes of a particular spin.

3. The device of claim 1, wherein said light source is intense enough that at least one of said pairs of electrons and holes is generated with a high probability for said pulse.

4. The device of claim 1, wherein said light source is a pulsed laser.

5. The device of claim 1, wherein said photon emitter is a semiconductor quantum dot.

6. The device of claim 5, wherein said semiconductor quantum dot comprises a tiny island of smaller-bandgap semiconductor material surrounded by a larger-bandgap matrix.

7. The device of claim 6, wherein said semiconductor quantum dot is an InGaAs region surrounded by GaAs, an InP region surrounded by GaInP, or a GaAs region surrounded by AlGaAs.

8. The device of claim 1, wherein said filter rejects scattered light from said light source.

9. The device of claim 1, wherein said filter is an interference filter or a diffraction grating monochrometer.

10. The device of claim 1, further comprising a micro-cavity to direct said emitted photons into a single spatial mode and coupling said single mode single photons to one or more optical elements.

11. The device of claim 10, wherein said micro-cavity comprises a small volume and a means for long photon storage time.

12. The device of claim 10, wherein said micro-cavity is a micro-post distributed-Bragg-reflector cavity or a micro-sphere cavity.

13. A method for generating triggered single photons, comprising the steps of:
  (a) providing a photon emitter;
  (b) delivering a pulse to said photon emitter with a light source to generate pairs of electrons and holes inside said photon emitter to emit photons, wherein said light source comprises means to tune a pulse wavelength to an excited state-absorption resonance of said photon emitter; and
  (c) filtering said emitted photons with a filter to isolate the last and single photon, said filter comprises means to distinguish between excitonic and biexcitonic emissions lines.

14. The method of claim 13, wherein said light source further comprises means to selectively choose a polarization to create said pairs of electrons and holes of a particular spin.

15. The method of claim 13, wherein said light source is intense enough that at least one of said pairs of electrons and holes is generated with a high probability for said pulse.

16. The method of claim 13, wherein said light source is a pulsed laser.

17. The method of claim 13, wherein said photon emitter is a semiconductor quantum dot.

18. The method of claim 17, wherein said semiconductor quantum dot comprises a tiny island of smaller-bandgap semiconductor material surrounded by a larger-bandgap matrix.

19. The method of claim 18, wherein said semiconductor quantum dot is an InGaAs region surrounded by GaAs, an InP region surrounded by GaInP, or a GaAs region surrounded by AlGaAs.

20. The method of claim 13, wherein said filter rejects scattered light from said light source.

21. The method of claim 13, wherein said filter is an interference filter or a diffraction grating monochrometer.

22. The method of claim 13, further comprising a step of providing a micro-cavity to direct said emitted photons into a single spatial mode and coupling said single mode single photons to one or more optical elements.

23. The method of claim 22, wherein said micro-cavity comprises a small volume and a means for long photon storage time.

24. The method of claim 22, wherein said micro-cavity is a micro-post distributed-Bragg-reflector cavity or a micro-sphere cavity.

25. A device for producing triggered pairs of polarization-entangled photons, comprising:
  (a) a photon emitter; and
  (b) a light source to deliver a pulse to said photon emitter generating two electron-hole pairs with opposite spin inside said photon emitter to emit two photons, wherein the first of said two photons is at a biexcitonic wavelength and the second of said two photons is at an excitonic wavelength.

26. The device of claim 25, wherein said light source is a pulsed laser.

27. The device of claim 25, wherein said photon emitter is a semiconductor quantum dot.

28. The device of claim 27, wherein said semiconductor quantum dot comprises a tiny island of smaller-bandgap semiconductor material surrounded by a larger-bandgap matrix.

29. The device of claim 28, wherein said semiconductor quantum dot is an InGaAs region surrounded by GaAs, an InP region surrounded by GaInP, or a GaAs region surrounded by AlGaAs.

30. The device of claim 25, further comprising a micro-cavity to increase the collection efficiency of said emitted photons and to direct said emitted photons into a single spatial mode and coupling said single mode single photons to one or more optical elements.

31. The device of claim 30, wherein said micro-cavity comprises a small volume and a means for long photon storage time.

32. The device of claim 30, wherein said micro-cavity is a micro-post distributed-Bragg-reflector cavity or a micro-sphere cavity.

33. The device of claim 30, wherein said micro-cavity has a first spatial mode and a second spatial mode, each is resonant with a corresponding spectral photon line.

34. A method for producing triggered pairs of polarization-entangled photons, comprising the steps of:
  (a) providing a photon emitter; and
  (b) delivering a pulse to said photon emitter with a light source to generate two electron-hole pairs with opposite spin inside said photon emitter to emit two photons, wherein the first of said two photons is at a biexcitonic wavelength and the second of said two photons is at an excitonic wavelength.

35. The method of claim 34, wherein said light source is a pulsed laser.

36. The method of claim 34, wherein said photon emitter is a semiconductor quantum dot.

37. The method of claim 36, wherein said semiconductor quantum dot comprises a tiny island of smaller-bandgap semiconductor material surrounded by a larger-bandgap matrix.

38. The method of claim 37, wherein said semiconductor quantum dot is an InGaAs region surrounded by GaAs, an InP region surrounded by GaInP, or a GaAs region surrounded by AlGaAs.

39. The method of claim 34, further comprising a step of providing a micro-cavity to increase a collection efficiency of said emitted photons and to direct said emitted photons into a single spatial mode and coupling said single mode single photons to one or more optical elements.

40. The method of claim 39, wherein said micro-cavity comprises a small volume and a means for long photon storage time.

41. The method of claim 39, wherein said micro-cavity is a micro-post distributed-Bragg-reflector cavity or a microsphere cavity.

42. The method of claim 39, wherein said micro-cavity has a first spatial mode and a second spatial mode, each is resonant with a corresponding spectral photon line.

43. A device for producing triggered pairs of polarization-entangled photons, comprising:
(a) a photon emitter; and
(b) a light source to deliver two pulses in succession to said photon emitter, wherein the first of said two pulses is tuned to a narrow absorption resonance to generate a first electron-hole pair in an excited state, and with a polarization of said light source chosen to yield a definite spin, and the second of said two pulses at a slightly lower energy is tuned to a narrow absorption resonance to generate a second electron-hole pair in an excited state, and with a polarization chosen to yield a spin opposite to that of said first electron-hole pair.

44. The device of claim 43, wherein said light source is a pulsed laser.

45. The device of claim 43, wherein said photon emitter is a semiconductor quantum dot.

46. The device of claim 45, wherein said semiconductor quantum dot comprises a tiny island of smaller-bandgap semiconductor material surrounded by a larger-bandgap matrix.

47. The device of claim 46, wherein said semiconductor quantum dot is an InGaAs region surrounded by GaAs, an InP region surrounded by GaInP, or a GaAs region surrounded by AlGaAs.

48. The device of claim 43, further comprising a filter to reject scattered light from said light source.

49. The device of claim 43, further comprising a micro-cavity to increase the collection efficiency of said emitted photons and to direct said emitted photons into a single spatial mode and coupling said single mode single photons to one or more optical elements.

50. The device of claim 49, wherein said micro-cavity comprises a small volume and a means for long photon storage time.

51. The device of claim 49, wherein said micro-cavity is a micro-post distributed-Bragg-reflector cavity or a microsphere cavity.

52. The device of claim 49, wherein said micro-cavity has a first spatial mode and a second spatial mode each is resonant with a corresponding spectral photon line.

53. A method for producing triggered pairs of polarization-entangled photons, comprising the steps of:
(a) providing a photon emitter; and
(b) delivering two pulses in succession with a light source to said photon emitter, wherein the first of said two pulses is tuned to a narrow absorption resonance to generate a first electron-hole pair in an excited state, and with a polarization of said light source chosen to yield a definite spin, and the second of said two pulses at a slightly lower energy is tuned to a narrow absorption resonance to generate a second electron-hole pair in an excited state, and with a polarization chosen to yield a spin opposite to that of said first electron-hole pair.

54. The method of claim 53, wherein said light source is a pulsed laser.

55. The method of claim 53, wherein said photon emitter is a semiconductor quantum dot.

56. The method of claim 55, wherein said semiconductor quantum dot comprises a tiny island of smaller-bandgap semiconductor material surrounded by a larger-bandgap matrix.

57. The method of claim 56, wherein said semiconductor quantum dot is an InGaAs region surrounded by GaAs, an InP region surrounded by GaInP, or a GaAs region surrounded by AlGaAs.

58. The method of claim 53, further comprising a step of filtering to reject scattered light from said light source.

59. The method of claim 53, further comprising a step of providing a micro-cavity to increase the collection efficiency of said emitted photons and to direct said emitted photons into a single spatial mode and coupling said single mode single photons to one or more optical elements.

60. The method of claim 59, wherein said micro-cavity comprises a small volume and a means for long photon storage time.

61. The method of claim 59, wherein said micro-cavity is a micro-post distributed-Bragg-reflector cavity or a microsphere cavity.

62. The method of claim 59, wherein said micro-cavity has a first spatial mode and a second spatial mode each is resonant with a corresponding spectral photon line.

63. A device for producing triggered pairs of polarization-entangled photons, comprising:
(a) a photon emitter; and
(b) a light source to deliver a pulse to said photon emitter generating several electron-hole pairs of both spins; and
(c) a filter to isolate only a single-exciton emission line and narrowly accept only the emission line corresponding to two electron-hole pairs with opposite spins.

64. The device of claim 63, wherein said light source is a pulsed laser.

65. The device of claim 63, wherein said photon emitter is a semiconductor quantum dot.

66. The device of claim 65, wherein said semiconductor quantum dot comprises a tiny island of smaller-bandgap semiconductor material surrounded by a larger-bandgap matrix.

67. The device of claim 66, wherein said semiconductor quantum dot is an InGaAs region surrounded by GaAs, an InP region surrounded by GaInP, or a GaAs region surrounded by AlGaAs.

68. The device of claim 63, wherein said filter rejects scattered light from said light source.

69. The device of claim 63, further comprising a micro-cavity to increase the collection efficiency of said emitted photons and to direct said emitted photons into a single spatial mode and coupling said single mode single photons to one or more optical elements.

70. The device of claim 69, wherein said micro-cavity comprises a small volume and a means for long photon storage time.

71. The device of claim 69, wherein said micro-cavity is a micro-post distributed-Bragg-reflector cavity or a microsphere cavity.

72. The device of claim 69, wherein said micro-cavity has a first spatial mode and a second spatial mode each is resonant with a corresponding spectral photon line.

73. A method for producing triggered pairs of polarization-entangled photons, comprising:

(a) providing a photon emitter;

(b) delivering a pulse with a light source to said photon emitter generating several electron-hole pairs of both spins; and (c) filtering with a filter only a single-exciton emission line and narrowly accept only the emissions line corresponding to two electron-hole pairs with opposite spins.

74. The method of claim 73, wherein said light source is a pulsed laser.

75. The method of claim 73, wherein said photon emitter is a semiconductor quantum dot.

76. The method of claim 75, wherein said semiconductor quantum dot comprises a tiny island of smaller-bandgap semiconductor material surrounded by a larger-bandgap matrix.

77. The method of claim 76, wherein said semiconductor quantum dot is an InGaAs region surrounded by GaAs, an InP region surrounded by GaInP, or a GaAs region surrounded by AlGaAs.

78. The method of claim 73, wherein said filter rejects scattered light from said light source.

79. The method of claim 73, further comprising providing a micro-cavity to increase the collection efficiency of said emitted photons and to direct said emitted photons into a single spatial mode and coupling said single mode single photons to one or more optical elements.

80. The method of claim 79, wherein said micro-cavity comprises a small volume and a means for long photon storage time.

81. The method of claim 79, wherein said micro-cavity is a micro-post distributed-Bragg-reflector cavity or a micro-sphere cavity.

82. The method of claim 79, wherein said micro-cavity has a first spatial mode and a second spatial mode each is resonant with a corresponding spectral photon line.

\* \* \* \* \*